United States Patent [19]

Haines

[11] 4,003,269
[45] Jan. 18, 1977

[54] POWER TRANSMISSION BELT

[75] Inventor: William M. Haines, Englewood, Colo.

[73] Assignee: The Gates Rubber Company, Denver, Colo.

[22] Filed: Feb. 17, 1976

[21] Appl. No.: 658,635

[52] U.S. Cl. .................................. 74/229; 74/234; 74/237
[51] Int. Cl.² .................. F16H 7/00; F16G 5/00; F16G 1/22; F16G 5/10
[58] Field of Search ................ 74/229, 231 R, 234, 74/237

[56] References Cited

UNITED STATES PATENTS

| | | | |
|---|---|---|---|
| 1,792,921 | 2/1931 | Newhouse | 74/229 X |
| 1,982,869 | 12/1934 | Heyer | 74/234 X |
| 2,361,645 | 10/1944 | Nassimbene | 74/234 |

*Primary Examiner*—Leonard H. Gerin
*Attorney, Agent, or Firm*—H. W. Oberg, Jr.; Raymond Fink; Curtis H. Castleman, Jr.

[57] ABSTRACT

A power transmission belt with a tensile member interpositioned between first and second layers wherein the second layer includes two longitudinal rows of spaced teeth that are alternately spaced in relation to each other and wherein the teeth have oppositely oriented outward faces that define belt driving surfaces.

11 Claims, 6 Drawing Figures

POWER TRANSMISSION BELT

BACKGROUND OF THE INVENTION

The invention relates to machine elements and mechanisms, but more particularly, the invention relates to endless power transmisson belts with plural driving surfaces of the V-type.

Power is transmitted between a belt and a sheave as oppositely facing driving surfaces of the belt are wedged in a V-groove of the sheave by means of belt tension. The outside edges of the tensile member are supported by opposite faces that define the sheave groove while the center portion of the tensile member receives no direct support other than by belt construction per se. Thus, the mid-portion of the tensile member is subject to being disposed at a point radially inward of the outside edge portions of the tensile member which overstresses the outside edge of the tensile member.

As was early recognized and disclosed in U.S Pat. Nos. 2,194,833 and 2,292,290, the tensile member may be constructed transversely convex with the convex side towards the outer surface of the belt so that when the belt is tensioned in a sheave, the mid-portion of the tensile member is not easily displaced to a point radially inward of the outside edges of the tensile member. Thus, the convex construction helps distribute a tensile load to the mid-portion of the tensile member.

The problem of distributing the tensile load to the mid-portion of the tensile member becomes greater as the ratio of belt width to belt thickness is increased or if belt tension is increased. The problem is particularly associated with variable speed type belts where a large belt width to belt thickness ratio is required to effect a predetermined speed ratio change in a sheave. Convexly arching the tensile member is insufficient to overcome the movement of the mid-portion of the tensile member to a radially inward point under high belt tensions.

SUMMARY OF THE INVENTION

In accordance with the invention, the endless power transmission belt is provided having a tensile member interpositioned between first and second layers. The first layer defines the top of the belt and the second layer defines the bottom of the belt comprised of two rows of alternately longitudinally spaced teeth having oppositely oriented faces that define belt driving surfaces. When the belt is operated in a sheave, the driving surfaces react against the faces of the sheave to push the mid-portion of the tensile member radially outward in a generally convex fashion.

Accordingly, an object of the invention is to provide a belt with a geometric shape which enhances transverse tensile load distribution in the tensile member when the belt is operated on a sheave.

Another object of the invention is to provide a V-type belt having a large width to thickness ratio for operating in variable pitch sheaves.

An advantage of the invention is that a variable speed type belt is provided which has improved power transmission capabilities.

Another advantage is that the power transmisson belt of the invention runs cooler than a standard variable speed belt at the same power conditions.

These and other objects or advantages of the invention will be apparent after reviewing the drawings and description thereof wherein.

DESCRIPTION OF PREFERRED EMBODIMENTS

Figure 1:
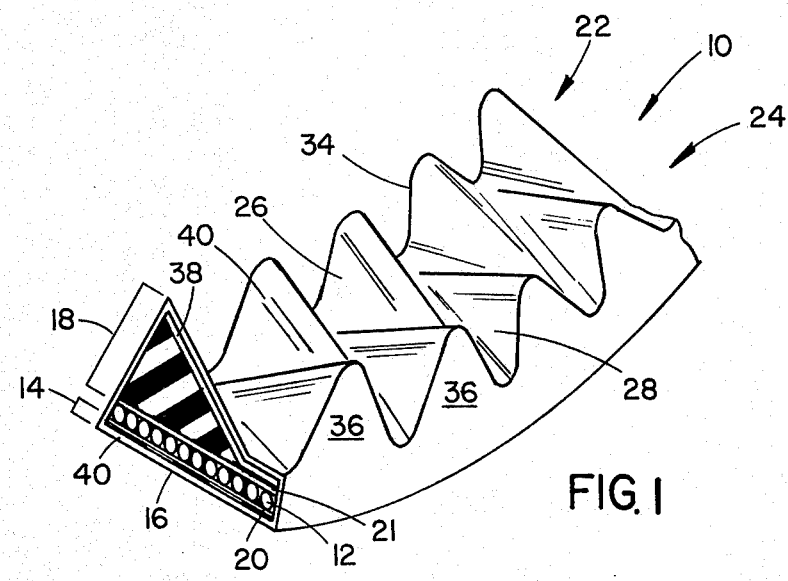
FIG. 1 is a partial isometric view looking generally toward the underside of a bent belt of the invention.
Figure 2:
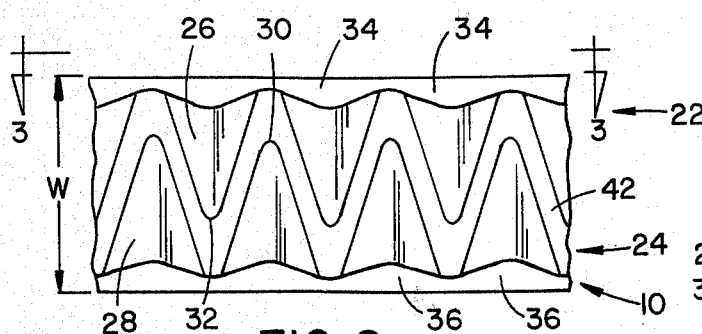
FIG. 2 is a flattened plan view of a bottom portion of the belt.
Figure 3:
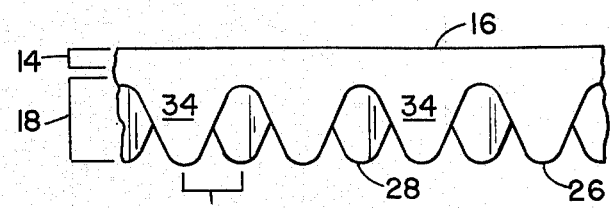
FIG. 3 is a side view of a portion of the belt taken generally along the line 3—3 of FIG. 2.

Referring to the figures, an endless power transmission belt 10 of the V-type is provided which has a tensile member 12 interpositioned between a first layer 14 which defines the top 16 of the belt and a second layer 18 that defines the bottom of the belt. The belt is made using known belt fabricating techniques, and molding and curing processes. The belt tensile member is preferably formed by one or more spirally wound cord bundles. The tensile member may be made of materials such as steel cable, nylon, aramid, polyester, or the like.

The first layer 14 forming the top of the belt is predominantly of an elastomeric material. The first layer may include reinforcements 20 above the tensile member such as oriented cord, square woven knit fabric or fiber loaded stock. The elastomeric material may be, for example, natural or synthetic rubbers or blends thereof; castable rubber or rubber-like materials such as polyurethane; or thermosetting materials such as polyester.

The second layer 18 is also of a predominantly elastomeric material that may include reinforcements 21 such as oriented cord, square woven or knit fabric, or fiber loaded stock. The second layer includes two rows 22, 24 of spaced teeth 26, 28 where the teeth of one row are alternately longitudinally spaced S from the teeth of the second row. Preferably, the teeth are in the form of tetrahedrons with apices 30, 32 that interdigitate with each other. The teeth preferably extend across at least a portion of the width W of the belt and more preferably across at least two-thirds of the belt with oppositely oriented portions of the tetrahedrons having faces which define V-belt driving surfaces 34, 36. Also, the reinforcement may be oriented transversely in the second layer to help support the tensile member.

The teeth 26, 28 are preferably of a high modulus and heat resistant elastomeric material. The teeth may be compounded with carbon and sulfur in known manner to help obtain a high modulus. Also, the teeth may include reinforcing filling materials such as phenolic, asbestos, epoxy or fibers. For example, a tooth material having a shore D durometer of 45 and impregnated with phenolic has been used successfully with a first layer having a shore A durometer range of 68–74. A high modulus material is preferred for distributing forces from the driving surfaces 34, 36 to the tensile member 12 when high power loads are to be transmitted by the belt (e.g., a 1⅛ inch top width belt, 20 horsepower, 1750 rpm). The teeth are preferably reinforced 38 near their exterior with cord fabric such as monofilament nylon that is generally transversely oriented. A reinforcement 38 of nylon cord extends generally transversely of the belt along the exterior surface of the tetrahedrons. This orients the cord from the driving surfaces 34, 36 toward the tensile member 12 which loads the reinforcement 38 much like a column. Of course, more than one layer of cord fabric or other reinforcement may be used.

Optionally, but preferably, one or more band plies 40 are disposed around the exterior surface of the belt. The band plies may be a rubber impregnated square woven bias fabric, knit fabric, or the like.

When tetrahedrons of the same size are interdigitated with each other along the bottom surface of the belt, they form a generally zigzag groove 42. The interdigitation may be chosen such that the circumferential length around the bottom surface of the belt is substantially the same across the entire width W of the belt. In other words, the circumferential perimeter length near the edges of the belt is the same as the circumferential perimeter length at the mid point of the belt. This feature permits materials such as square woven fabric or cord fabric to be used without individually fitting each tooth with a reinforcement to accommodate a circumferential length change. This, of course, expedites manufacturing.

Figure 4:
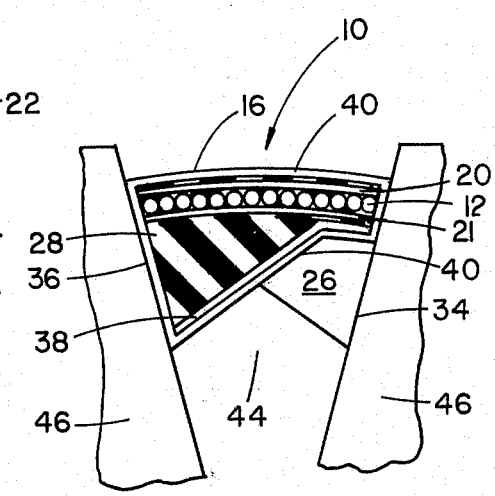
FIG. 4 is a radial cross section showing the belt of the invention tensioned in a groove of a sheave.

In use, the belt 10 is positioned in the groove 44 of a sheave 46. The oppositely facing driving surfaces of the belt contact the faces of the sheave groove. When tension is applied to the belt, a radially inward force wedges the belt in the groove. The force is transferred from the driving faces 34, 36 of the teeth toward the tensile member or the center of the belt. The alternate longitudinal spacing S of the two rows of teeth introduce a force unbalance in the belt causing it to arch or convexly bend (FIG. 4). The unbalance results from there being no surface or an unproportional surface area transversely aligned of each tooth driving surfaces 34, 36. If desirred, the V-angle of the belt may be cut slightly smaller (2° to 6°) than the included angle of the sheave groove. This causes the belt to further bend slightly convexly arching the tensile member.

An experiment was conducted to illustrate the effectiveness of the alternately longitudinally spaced teeth in loading the mid-portion of the tensile member layer of a 1¼ inch top width belt. A strain gauge was vulcanized to the upper surface of the tensile member and calibrated to indicate zero deflection. The belt was positioned between two sheaves and each belt was tensioned to 113 pounds force to simulate a dynamic tension load. One sheave was slowly rotated to simulate a drive sheave while the other sheave simulated a driven sheave. It was found that the upper surface of the tensile member of the belt deflected radially to a maximum point 0.0059 inches above its calibrated zero position in the drive sheave and to a maximum point .0064 inches above its zero calibrated position in the driven sheave. When the tension was increased to 377 pounds, the belt in both the driver and driven sheave showed greater convexity of 0.0081 inches indicating that as the tension increases more of the sheave drive forces are distributed by the center belt cords.

The belt construction also yields several peformance advantages over conventionally configured variable speed belts. The spaced tooth construction permits approximately 50 percent less material volume to be used in the second layer than a conventional variable speed belt while simultaneously providing a good support for the tensile member to carry higher horsepower loads. To illustrate this point, a belt of this invention was compared to a standard production belt of 1¼ inch top width having generally the same circumferential length, and tensile member construction. Both belts were operated on the same test equipment using 28° sheaves. Both belts were operated for 91.4 hours at 11 horsepower after which the power load was increased to 16 horsepower. At 16 horsepower, the belt of the invention operated for 20.5 hours at 265° F. while the belt of conventional construction operated for 3 hours at 360° F.

ADDITIONAL SPECIES

Figure 5:
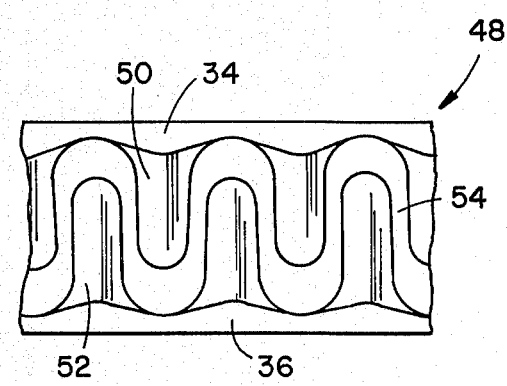
FIG. 5 is a view similar to FIG. 2 but showing an alternate form of the invention.

FIG. 5 depicts an illustration of an alternate form 48 of the invention were the profiles of the teeth 50, 52 are changed so that the zigzag pattern 54 between teeth is substantially transversely of the belt. Such a belt operates in the same manner as described above.

Figure 6:
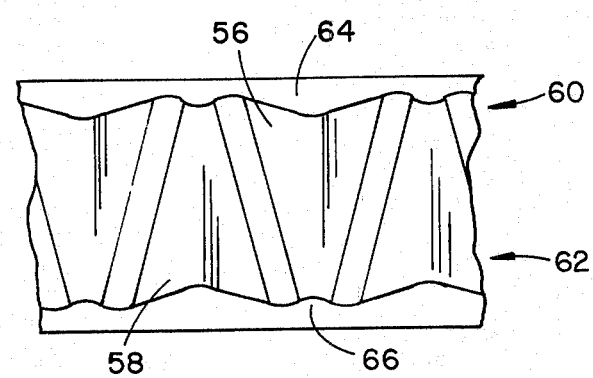
FIG. 6 is a view similar to FIG. 2 showing an alternate form of the invention.

In FIG. 6, the teeth 56, 58 of a row 60, 62 may also extend completely transversely of the belt provided that the driving surface 64 of a tooth 56 is always larger than the oppositely extending transverse portion 66 of the tooth that is in contact with a sheave. Such a differential surface generates a force unbalance in the belt to arch it convexly.

The foregoing description is made for purpose of illustration only and is not intended to limit the scope of the invention which is to be determined from the appended claims.

What is claimed is:

1. A power transmission belt having a top, and bottom, and oppositely facing side driving surfaces extending therebetween, said belt comprising:
   a tensile member;
   a first layer secured to the tensile member and defining the top of the belt;
   a second layer secured to the tensile member and defining the bottom of the belt, said second layer comprising two rows of spaced teeth oriented longitudinally in relation to the belt, the teeth of the rows alternately longitudinally spaced from each other, and the teeth having oppositely oriented faces which substantially define the driving surfaces of the belt.

2. The V-belt of claim 1 wherein teeth of the two rows interdigitate with portions of each other.

3. The V-belt of claim 2 wherein the teeth have a generally tetrahedron shape with four generally triangular sides, each tooth oriented with one triangular side secured to the tensile member and a second triangular side that defines a portion of the driving surfaces.

4. The V-belt of claim 3 wherein apexes of the generally tetrahedron shaped teeth interdigitate with each other.

5. The V-belt of claim 4 wherein the tetrahedron shaped teeth each extend substantially transversely across the entire width of the belt.

6. The V-belt of claim 4 wherein the tetrahedron shaped teeth each extend substantially transversely across less than the entire width of the belt and define a generally zigzag pattern in the second layer.

7. The V-belt of claim 4 which further includes a textile reinforcement juxaposed the bottom surface defined by portions of the tetrahedron shaped teeth.

8. The V-belt of claim 7 wherein the textile reinforcement is a square woven rubberized fabric.

9. The V-belt of claim 8 wherein the tetrahedron shaped teeth are sized and arranged such that the bottom has generally the same circumference across the belt.

10. The V-belt of claim 7 wherein the textile reinforcement is a cord fabric with the cords oriented generally transversely of the belt.

11. The V-belt of claim 1 wherein the first layer is of a predominantly elastomeric material and the second layer has a substantially higher modulus that the first layer and having rubber teeth reinforced with a material selected from the group consisting of phenolic, asbestos, epoxy and fibers.

* * * * *